United States Patent
Elfardy et al.

(10) Patent No.: US 11,418,461 B1
(45) Date of Patent: Aug. 16, 2022

(54) ARCHITECTURE FOR DYNAMIC MANAGEMENT OF DIALOG MESSAGE TEMPLATES

(71) Applicant: Amazon Technologies, Inc., Seattle, WA (US)

(72) Inventors: Hebatallah Elfardy, Seattle, WA (US); Jingxiang Chen, Bellevue, WA (US); Jared Kramer, Seattle, WA (US); Andrea Kahn, Seattle, WA (US); Simi Wang, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 244 days.

(21) Appl. No.: 15/929,825

(22) Filed: May 22, 2020

(51) Int. Cl.
*H04L 51/02* (2022.01)
*G06F 40/56* (2020.01)
*G06N 20/00* (2019.01)
*G06Q 30/00* (2012.01)

(52) U.S. Cl.
CPC .............. *H04L 51/02* (2013.01); *G06F 40/56* (2020.01); *G06N 20/00* (2019.01); *G06Q 30/016* (2013.01)

(58) Field of Classification Search
None
See application file for complete search history.

(56) References Cited

U.S. PATENT DOCUMENTS

| | | | |
|---|---|---|---|
| 9,473,637 B1 * | 10/2016 | Venkatapathy | G10L 15/22 |
| 10,498,898 B2 * | 12/2019 | Mazza | H04M 3/5183 |
| 2018/0307675 A1 * | 10/2018 | Akkiraju | G06N 20/00 |
| 2019/0034514 A1 * | 1/2019 | Jetcheva | G06F 16/3329 |
| 2019/0121907 A1 * | 4/2019 | Brunn | H04W 4/12 |
| 2019/0147853 A1 * | 5/2019 | Gunasekara | G06F 40/284 704/243 |
| 2019/0155905 A1 * | 5/2019 | Bachrach | G10L 25/30 |
| 2019/0251165 A1 * | 8/2019 | Bachrach | G06N 3/084 |
| 2020/0019609 A1 * | 1/2020 | Yu | G06N 3/0445 |

OTHER PUBLICATIONS

Alibaba's Customer Service Chatbot: AliMe Chat: A Sequence to Sequence and Rerank based Chatbot Engine http://www.aclweb.org/anthology/P17-2079.
Google Duplex: https://ai.googleblog.com/2018/05/duplex-ai-system-for-natural-conversation.html.
Google SmartReply: https://dl.acm.org/citation.cfm?doid=2939672.2939801.
Vermorel, J., & Mohri, M. (Oct. 2005). Multi-armed bandit algorithms and empirical evaluation. In European conference on machine learning (pp. 437-448). Springer, Berlin, Heidelberg.

* cited by examiner

*Primary Examiner* — Nafiz E Hoque
(74) *Attorney, Agent, or Firm* — Knobbe, Martens, Olson & Bear, LLP

(57) ABSTRACT

A pipeline is provided for management of a pool of chat message templates for an automated dialog system. The pool of chat messages may be managed using machine learning-based clustering and feedback-based modifications. A set of chat messages may be analyzed using a machine learning model to generate different clusters of messages that are semantically related. Representative messages may be selected from each cluster and used in chat sessions according to the semantic context of the chat sessions. Based on feedback obtained during the chat sessions, metrics generated based on the feedback, and/or other data, modifications may be made to the clusters and/or the representative messages to improve the performance of the automated dialog system.

20 Claims, 6 Drawing Sheets

ARCHITECTURE FOR DYNAMIC MANAGEMENT OF DIALOG MESSAGE TEMPLATES

BACKGROUND

Computing systems can use communication networks to exchange information. In some cases, a user of one computing system may send questions, requests, commands, and the like to another computing system via a communication network, and receive a response from the other computing system via the communication network. The other computing system may be operated by another human user, or it may include an automated dialog system referred to as a "chatbot." Generally described, a chatbot is an automated dialog system that conducts on-line chat conversations using natural language (e.g., where both input and output are text, where the input to the chatbot is speech-to-text, or where the output from the chatbot is text-to-speech). Chatbots may be programmed to generate output based on an analysis of the user's input such that the output is responsive the user's input, or facilitates receipt of additional information needed to respond to the user's input.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
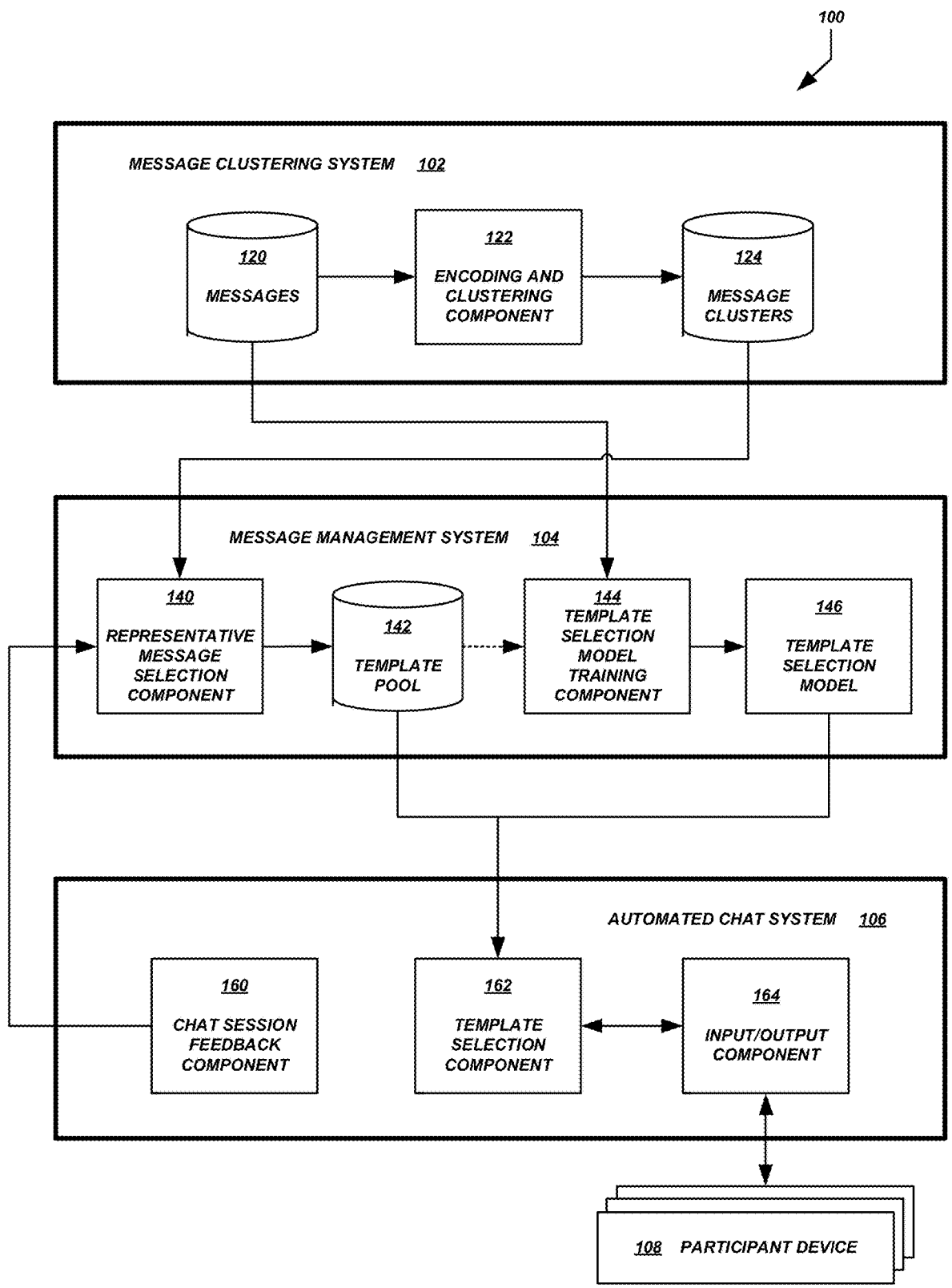
FIG. 1 is a diagram of an illustrative computing environment including a message clustering system, a message template management system, and a conversation management system according to some embodiments.

The present disclosure is directed to management of a pool of chat message templates for an automated dialog system. The pool of chat messages is managed using machine learning-based clustering and feedback-based modifications. A set of chat messages may be analyzed using a machine learning model to generate different clusters of messages that are semantically related. Representative messages may be selected from each cluster and used in chat sessions according to the semantic context of the chat sessions. Based on feedback obtained during the chat sessions, metrics generated based on the feedback, and/or other data, modifications may be made to the clusters and/or the representative messages to improve the performance of the automated dialog system.

Some conventional automated dialog systems, also referred to as "chatbots," use a rule-based or tree-based methodology to select a chat message for presentation at a particular point in a chat session. For example, a chatbot may present a message to a user and, based on user's response (e.g., yes/no, selection from a list, etc.), the chatbot may proceed down a branch of the conversation tree and present the next message. However, such systems may fail to provide the flexibility expected by users, may require a significant amount of manual configuration of the conversation tree, and may require a significant amount of manual curation of the messages. Other chatbots use generative machine learning models to generate messages word-by-word based on the state of a chat session, rather than managing a chat with a rigid tree and predetermined messages. While such chatbots may provide more flexibility and less manual configuration and curation than tree-based chatbots, they may also introduce complexity that makes it difficult to control the messages ultimately presented to users. Still other chatbots attempt to provide more flexibility and reduced manual effort in comparison with tree-based chatbots, while providing more control than chatbots that generate new messages word-by-word during chat sessions. For example, some chatbots incorporate a set of predetermined chat messages and use a ranking algorithm to dynamically select a predetermined chat message during a chat session. However, generating the set of predetermined chat messages can still be a time-consuming manual process that produces a less than optimal set of chat messages available for a conversation, and there is no way to efficiently and effectively arrive at an optimal set of chat messages through use of the chatbot.

Some aspects of the present disclosure address the issues noted above, among others, by analyzing chat messages using a machine learning process to automatically generate clusters of messages that are semantically related. In some embodiments, a corpus of preexisting chat messages may be obtained, such as textual chat messages sent by a particular participant or set of participations to be modeled by the chatbot (e.g., customer service representatives, technical support staff, etc.). Each textual chat message may be encoded into a dense quantitative form. The dense quantitative form, referred to as a sentence embedding, may be easier to analyze and manipulate in subsequent portions of the process than the original textual chat messages. For example, textual messages of varying length may each be encoded into word embeddings of uniform length, such as vectors having the same quantity of real-valued elements regardless of the length of the textual messages that the vectors represent. The sentence embeddings may be generated such that they represent the salient semantic information needed to reconstruct the chat messages in something close to their original textual form. The sentence embeddings generated for each chat message may be assigned to a cluster of similar sentence embeddings. The similarity of each sentence embedding in a cluster may be determined from the quantitative values of the sentence embeddings and may represent a semantic similarity of the original messages from which the sentence embeddings were generated. In some embodiments, the machine learning processes to generate sentence embeddings and to cluster the sentence embeddings may be jointly optimized in a multi-task process. Thus, sentence embeddings may be generated specifically for clustering with other semantically-related sentence embeddings in the same data domain (chat messages from a target chat session participant), rather than using pre-trained embeddings that are not optimized for the specific clustering to be performed. In addition, the clustering task itself can be optimized for identifying clusters of the task-specific sentence embeddings.

Additional aspects of the present disclosure address the issues above, among others, by providing a feedback-based pipeline for managing and modifying the messages selected from the message clusters for use in chat conversations. A representative message may be selected from each cluster and added to a pool of "template" messages. A chatbot may then be configured to select individual messages from the template pool for presentation during a chat session based on the context of the chat session. In some embodiments, to configure the chatbot to select messages, a template ranking model may be trained. Then the chatbot, with the template ranking model trained on the initial template pool, may be used in conversations with users. Information about the users' interactions with the chatbot during the conversations may be recorded and used as feedback data to modify messages in the template pool or clusters from which messages are selected for the template pool For example, throughout a chat session a user, such as a customer service representative or a technician, may be presented with a ranked list of the top k messages (where k is some positive integer) from the template pool that the template ranking model has been trained to select for the current context of the chat session. The user may accept or reject individual messages, suggest modifications or replacements for the messages, and the like. From these interactions, the pipeline tracks a variety of automated metrics as well as manual feedback and, based on the metrics, the pipeline may initiate modification actions to update the template pool. In some embodiments, modification actions may include: removing a cluster from consideration such that no message from the cluster is included in the template pool; adding a cluster to consideration such that messages from that cluster are included in the template pool; swapping one message from a cluster for a new representative message from that same cluster; keeping a message but manually making a small change to the message's wording; or adding a new message altogether to a cluster and to the template pool.

Various aspects of the disclosure will now be described with regard to certain examples and embodiments, which are intended to illustrate but not limit the disclosure. Although the examples and embodiments described herein will focus, for the purpose of illustration, on specific machine learning algorithms, encoding techniques, clustering techniques, chatbot systems, and message modifications, one skilled in the art will appreciate that the example devices and methods described herein are illustrative only, and are not intended to be exhaustive, required, or limiting. In some embodiments, additional and/or alternative machine learning algorithms, encoding techniques, clustering techniques, chatbot systems, and message modifications may be used.

Example Message Management Pipeline

FIG. 1 depicts an illustrative message management pipeline 100 in which aspects of the present disclosure may be implemented. In some embodiments, as shown, the message management pipeline 100 may include a message clustering system 102 to generate clusters of similar or otherwise related messages, a message management system 104 for managing how individual messages are to be selected and for implementing modifications to the messages, and an automated chat system 106 for managing chat sessions using the selected messages, collect feedback about the selected messages, and record metrics about the selected messages and chat sessions.

The systems and other components of the message management pipeline 100 may communicate with each via one or more communications networks, such as wired and/or wireless communication networks. The networks may include any combination of Personal Area Networks ("PANs"), Local Area Networks ("LANs"), Campus Area Networks ("CANs"), Metropolitan Area Networks ("MANs"), extranets, intranets, the Internet, short-range wireless communication networks (e.g., ZigBee, Bluetooth, etc.), Wide Area Networks ("WANs"), and/or any combination, permutation, and/or aggregation thereof.

The message clustering system 102 may include a messages data store 120 that stores a corpus of messages from which a template pool is to be generated. For example, the corpus of messages may include chat messages previously sent by party to be modeled by the automated chat system 106 (such as a technician or customer service representative), messages obtained from transcripts or message boards not managed by any chat system, curated messages created by an administrator operator, or the like. The message clustering system 102 may also include an encoding and clustering component 122 to generate encoded representations of the chat messages in the messages data store 120, and to generate clusters of semantically-similar or otherwise related chat messages. The message clustering system 102 may also include a message clusters data store 124 to store the message clusters generated by the encoding and clustering component 122. For example, the message clusters data store 124, also referred to simply as the "message clusters," may include or reference the text of the messages, encoded representations of the messages, metrics associated with the clustering decision made for the messages (e.g., similarity scores, confidence scores, etc.), identifiers of the clusters to which the messages belong, or data, or some combination thereof. The data in the message clusters data store 124 may be provided to the message management system 104 for generating a message template pool.

The message management system 104 may include a representative message selection component 140 for selecting, from each cluster of the message clusters 124 (or some subset of the message clusters 124), one or more representative messages to be included in a message template pool. For example, the representative message selection component 140 may select a representative message from each cluster based on metrics associated with the clustering decision made for the messages (e.g., the messages associated with the highest confidence score of any message in a given cluster, the messages closest to the centroids of their respective clusters, etc.). The message management system 104 may also include a template pool data store 142, also referred to simply as the "template pool," for storing the messages (or data regarding the messages) selected by the representative message selection component 140. The message management system 104 may also include a template selection model training component 144 to train a template selection model 146 to select a message from the template pool 142 for presentation at particular points in a chat session based on the semantic context of the chat session and/or other factors. The template selection model 146 and the data in the template pool 142 may be provided to the automated chat system 106 for conducting chat sessions and collecting metrics. Illustratively, as described in greater detail below, the metrics may later be used by the message management system 104 to modify the template pool 142 and/or retrain the template selection model 146.

The automated chat system 106 may include an input/output component 164 to receive input, such as natural language messages, from a participant computing device 108 during a chat session, and to provide output to the participant computing device 108. For example, the input/output component may be a server configured to send and receive textual content via internet protocol ("IP") data transmissions, send and receive audio content via the public switched telephone network ("PSTN") or IP data transmissions, or the like. The automated chat system 106 may also include a template selection component 162 that uses the template selection model 146 to select one or more messages from the template pool 142 for presentation during the chat session in response to the input received via the input/output component 164. The automated chat system 106 may also include a chat session feedback component 160 to record metrics and feedback about the chat sessions and messages selected during the chat sessions conducted by the automated chat system 106. For example, the chat session feedback component 160 may track the messages selected by the template selection component 162, whether the messages were accepted by the chat session participant (e.g., whether the participant responded affirmatively or otherwise as expected, whether the participant indicated the message was not relevant, etc.), the input that caused selection of the message, the outcome of the chat session, and the like. The chat session feedback component 160 may provide the chat session metrics and other feedback to the message management system 104 for refinement of the template pool 142, template selection model 146, etc.

Figure 2:
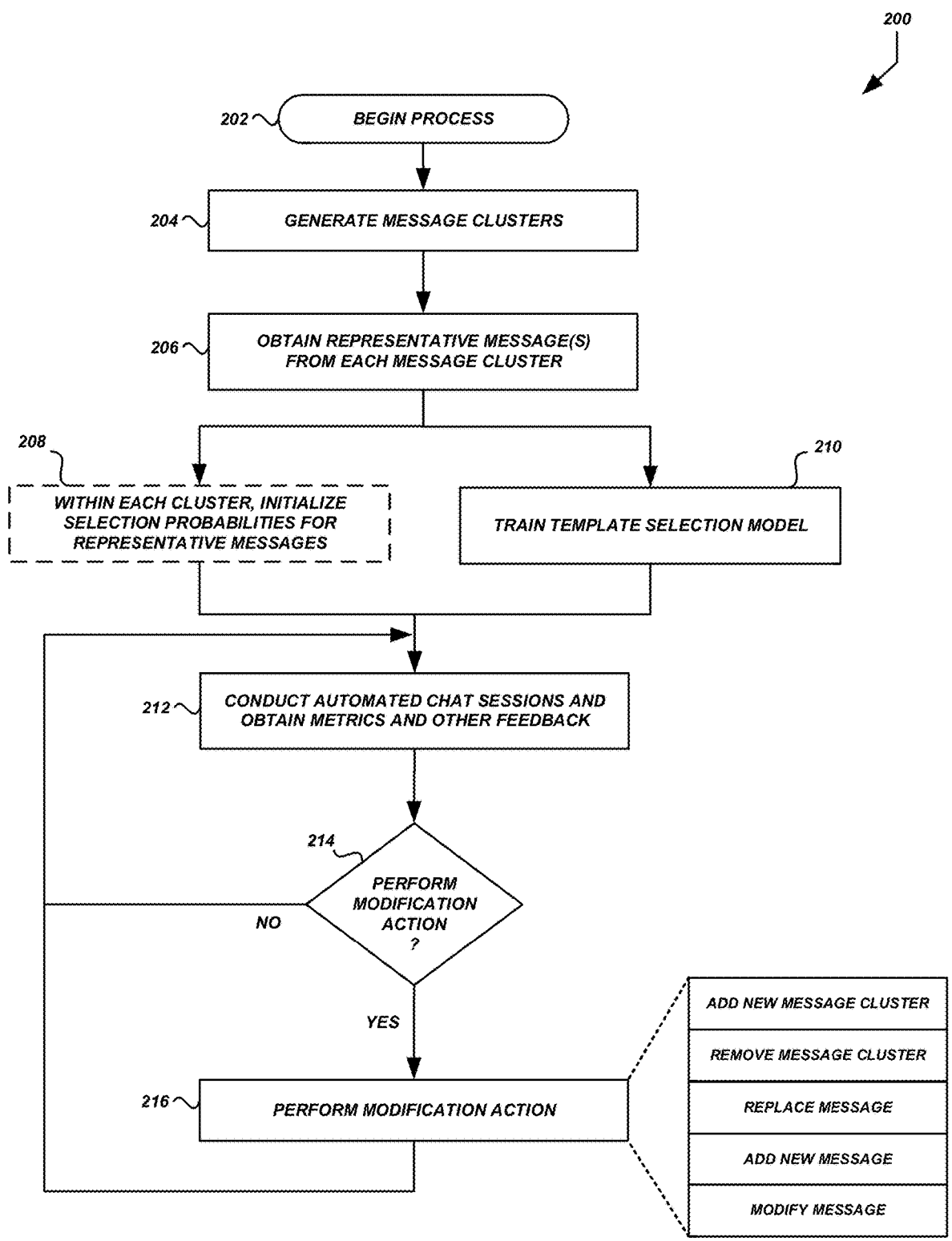
FIG. 2 is a flow diagram of an illustrative process for managing message templates according to some embodiments.

An example process for selecting a template pool, training a template selection model, conducting chat sessions, modifying the message template pool, and performing other message management operation is shown in FIG. 2 and discussed in greater detail below.

The message clustering system 102, message management system 104, and/or automated chat system 106 may be implemented on one or more physical server computing devices that provide computing services and resources. In some embodiments, the message clustering system 102, message management system 104, and automated chat system 106 (or individual components thereof, such as the encoding and clustering component 122, representative message selection component 140, model training component 146, template selection component 162, input/output component 164, chat session feedback component 160, etc.) may be implemented on one or more host devices, such as blade servers, midrange computing devices, mainframe computers, desktop computers, or any other computing device configured to provide computing services and resources. For example, a single host device may execute one or more components of a message clustering system 102, message management system 104, automated chat system 106, some combination thereof, etc. The message management pipeline 100 may include any number of such hosts.

In some embodiments, the features and services provided by the message clustering system 102, message management system 104, and/or automated chat system 106 may be implemented as web services consumable via one or more communication networks. In further embodiments, the message management pipeline 100 (or individual components thereof) is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

Example Message Template Management Process

FIG. 2 shows an illustrative process 200 for managing message templates used by an automated chat system. Advantageously, the process 200 includes machine learning-based clustering of messages for efficient generation of an initial template pool. In addition, the process 200 incorporates metrics and feedback from automated chat sessions conducted using the template pool. Based on the metrics and feedback, the template pool may be refined in an efficient and effective manner.

The process 200 begins at block 202. The process 200 may be embodied in a set of executable program instructions stored on a computer-readable medium, such as one or more disk drives, of a computing system, such as the computing system 600 shown in FIG. 6 and described in greater detail below. When the process 200 is initiated, the executable program instructions can be loaded into memory, such as RAM, and executed by one or more processors of the computing system. In some embodiments, portions of the process 200 may executed across multiple computing systems or processors of computing systems, serially or in parallel. Although the process 200 is described with respect to the computing system 600 shown in FIG. 6, the description is illustrative only and is not intended to be limiting.

Figure 5:
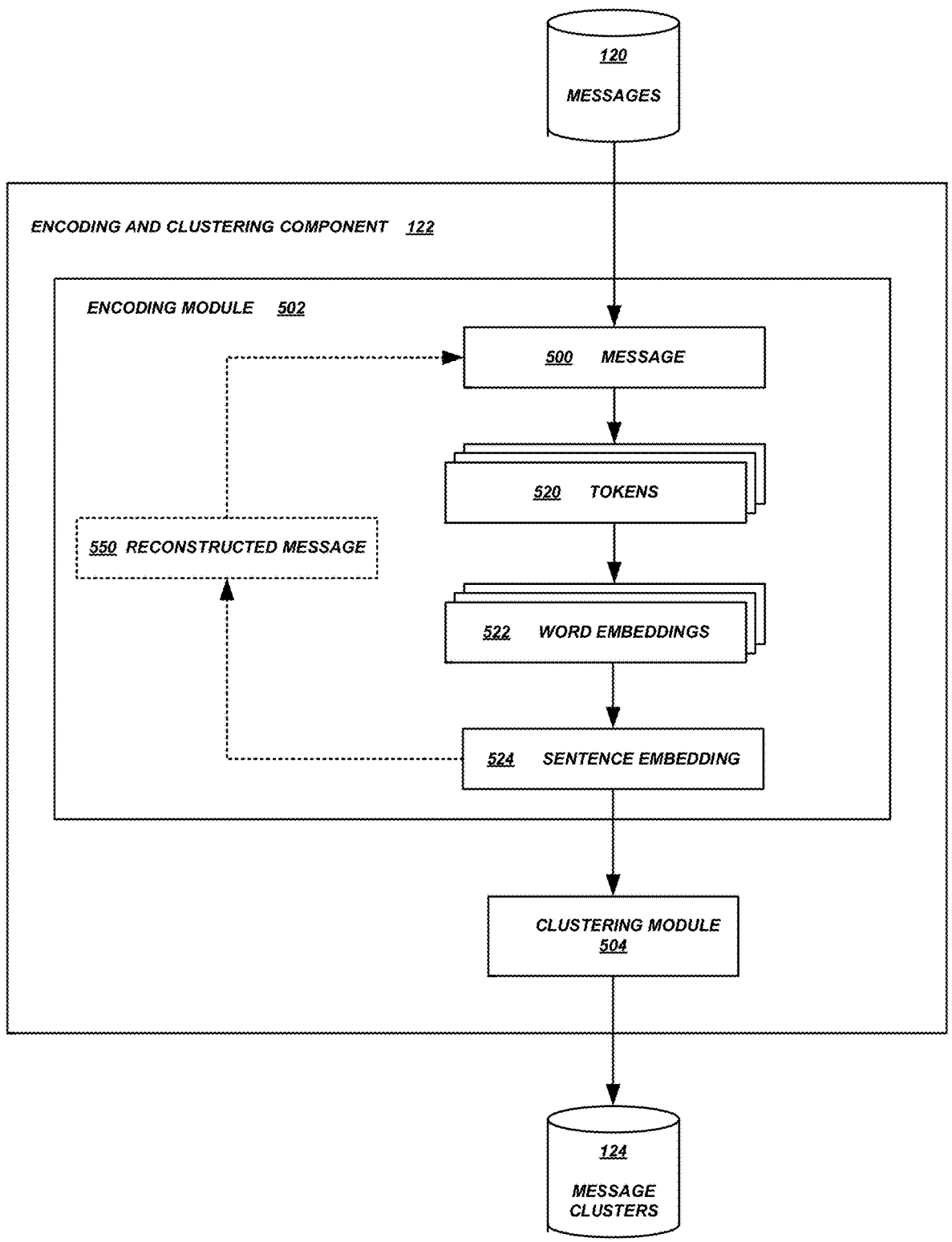
FIG. 5 is a diagram of illustrative workflows for message clustering according to some embodiments.

At block 204, the message clustering system 102 may generate clusters of messages from the messages data store 120. Illustratively, the corpus of messages in the messages data store 120 may include messages from prior chat sessions, including messages from entities who are to be modeled by the automated chat system 106, such as technicians, customer service representatives, or the like. The messages may relate to a variety of topics within the scope of the entities to be modeled. Moreover, within each topic there may be any number of associated operations, issues, tasks, or other interactions, and there may be any number of individual messages associated with each of these interactions. Differences in the wording used by the entity to be modeled, the reactions of the other entities in the chat session, other circumstances of the chat session, developments in the topic over time, and other variables may result in a large number of closely-related messages that are nevertheless distinct, whether in subtle or significant ways. To aid in selecting a pool of template messages to be used by the automated chat system 106, the message clustering system 102 may encode the messages into a form that includes salient semantic information and is able to be compared with other messages to detect similarities and differences more easily than comparing text to text. In the encoded form, the messages can be analyzed according to a clustering algorithm (e.g., k-means clustering, means-shift clustering, density-based spatial clustering of applications with noise or "DBSCAN," agglomerative clustering, etc.) to efficiently detect groupings of semantically-related messages. An example process for generating encoded representations of messages and generating message clusters using the encoded representations is shown in FIG. 5 and described in greater detail below.

Figure 3:
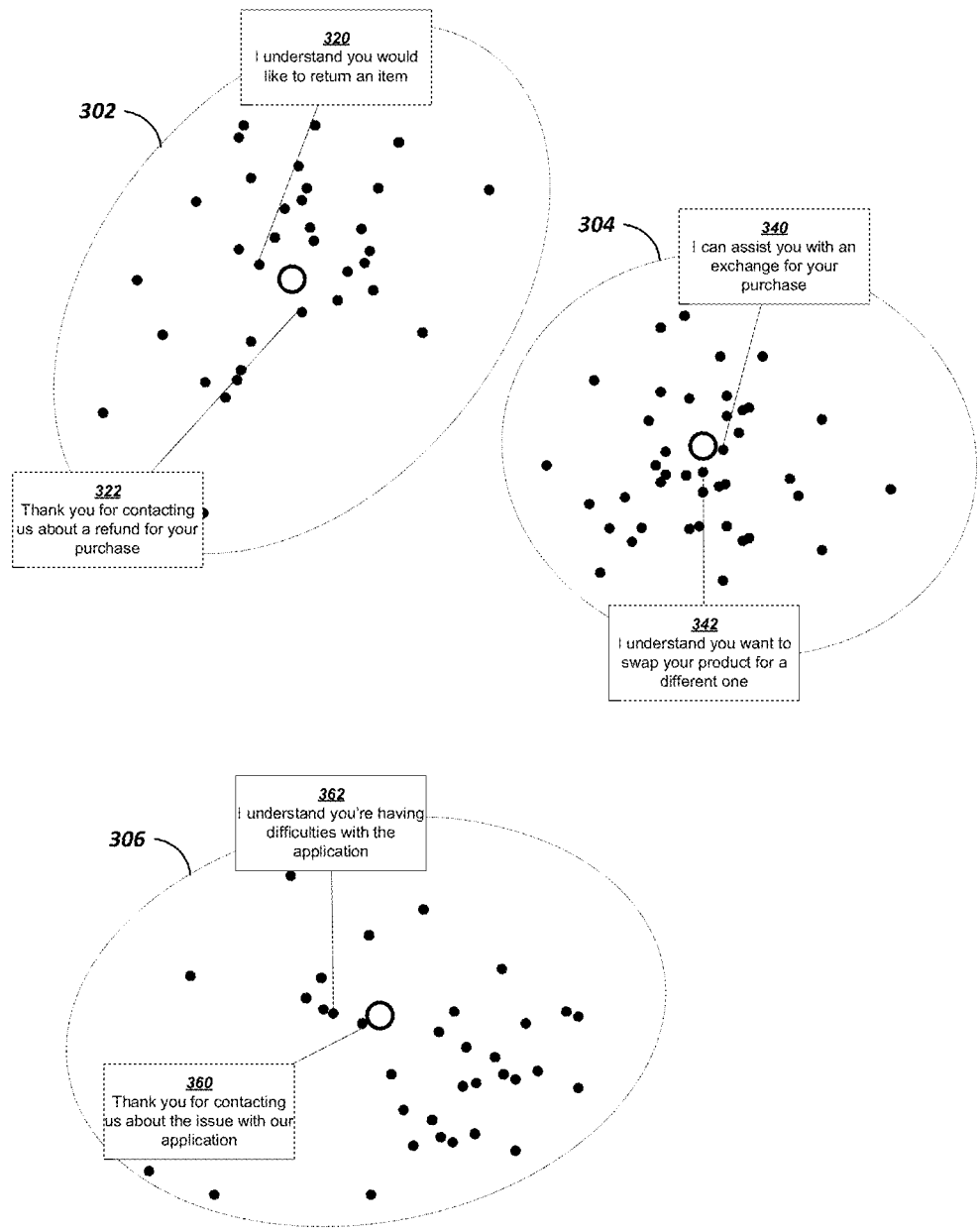
FIG. 3 is a diagram of illustrative message clusters and associated data according to some embodiments.

FIG. 3 shows an example of three clusters generated from a corpus of message data regarding customer service interactions. A first cluster 302 includes messages regarding return of a product. As shown, although each of the messages in cluster 302 relates to return of a product, there is different wording used in the messages and those differences result in somewhat different semantic content. For example, message 320 states "I understand you would like to return an item," while message 322 states "Thank you for contacting us about a refund for your purchase." A second cluster 304 includes messages regarding exchange of a product. Message 340 states "I can assist you with an exchange for your purchase," while message 342 states "I understand you want to swap your product for a different one." A third cluster 306 includes messages regarding technical support. Message 360 states "Thank you for contacting us about the issue with our application," while message 363 states "I understand you're having difficulties with the application." As shown, clusters 302 and 304 are closer to each other (e.g., as measured in Euclidean distance) than either cluster is to cluster 306. This difference in distance follows from the semantic content of the messages in the clusters: cluster 302 deals with return of a product which is more similar, semantically to cluster 304 which details with exchange of a product, than to cluster 306 which deals with a technical support issue. Although FIG. 3 shows three clusters with a limited number of messages in each cluster, the example is illustrative only and is not intended to be limiting. In some embodiments, there may be dozens, hundreds, or more clusters, and/or each cluster may have dozens, hundreds, thousands, or more unique messages.

Returning to FIG. 2, at block 206 the message management system 104 can obtain one or more representative messages from each of the message clusters. The representative messages may be used in a template pool 142 for the automated chat system 106 to use in conducting chat sessions. In some embodiments, a single representative message may be selected from each cluster (or a subset thereof). For example, a mean vector within a cluster (e.g., a centroid) may be determined by averaging the encoded representations of each message assigned to the cluster (or a subset thereof). A difference between the mean vector and each encoded representation may then be determined, such as the Euclidian distance, cosine distance, or some other representation of difference between two vectors. The message having an encoded representation with a smallest difference from the mean vector for a cluster may be selected as the representative message for that cluster. Other metrics may be used instead of, or in addition to, a distance from a mean vector. For example, a confidence score may be associated with each message, representing a confidence that the message is part of the cluster. The message with the highest confidence score may be selected as the representative message.

In some embodiments, multiple messages may be selected as representative of a cluster. For example, the n messages (where n is a positive integer) with the smallest distance from the mean vector, the highest confidence score, or strongest value for some other metric may be selected. As another example, the messages may be ranked by a common metric (e.g., difference from mean vector or confidence score), and the top p percent of messages (where p is a positive real number) may be selected. As a further example, all messages satisfying a selection criterion (e.g., minimum confidence score, maximum distance from mean vector) may be selected.

In FIG. 3, the messages are shown with their respective distance from the mean vectors of their respective clusters. If only a single message is selected from each cluster and the selection metric is distance from the mean vector, then message 320 may be selected for cluster 302, message 340 may be selected for cluster 304, and message 360 may be selected for cluster 306. If two messages are selected from each cluster and the selection metric is distance from the mean vector, then messages 320 and 322 may be selected for cluster 302, messages 340 and 342 may be selected for cluster 304, and messages 360 and 362 may be selected for cluster 306.

Returning to FIG. 2, at block 208 the message management system 104 may determine a selection probability for the representative messages. If only a single representative message is selected from each cluster, the selection probability may be set to 1.0, or this block may be skipped. If multiple representative messages are selected from each cluster, however, then a selection probability may be determined for each of the representative messages so that the automated chat system 106 may choose one. In addition, by setting different selection probabilities for each representative message of a cluster, the most representative message can be used most often, while still allowing for exploration of the other representative messages and the effects that the other representative messages will have on a chat session. In some embodiments, the probabilities may be proportional to or other otherwise based on the selection metrics associated with each message. For example, the initial probabilities may be set using Student's t-distribution based on the distance of the encoded vector representation of each representative message from the centroid of the cluster to which the representative messages belong.

At block 210, the template selection model training component 144 or some other component of the message management system 104 may train a template selection model 146 to be used by the automated chat system 106. The template selection model 146 may be configured to determine, for a given context of a chat session (e.g., most recent message(s) received from the other chat participant, most recent messages sent to the other chat participant, profile information regarding the participants, etc.), a particular message to be sent or a particular cluster from which message is to be chosen. Training the template selection model 146 may include generating training data from the corpus of messages in the messages data store 120, such as training data representing the context of each chat session when the message was sent. From this training data, the template selection model 146 can learn which messages (or clusters to which the messages have been assigned) are to be used for given chat session contexts. In some embodiments, the selection probabilities generated at block 208 may also be incorporated into the template selection model 146. In some embodiments, such as after one or more automated chat sessions have been conducted as described in greater detail below, the template selection model training component 144 may re-train or otherwise fine tune the template selection model 146. The retraining may be based on the message templates used by the automated chat system 106 to conduct the automated chat sessions. Training data to re-train the template selection model 146 may include such message templates instead of, or in addition to, the messages from the messages data store 120 used previously to train the template selection model 146.

In some embodiments, output of the template selection model 146 may be a ranked list of the top k messages for the current chat session context (where k is a positive integer). Consumers of the template selection model output, such as the template selection component 162, may then select the top message from the ranked list for presentation to the other chat participant. In some embodiments, as described in greater detail below, the entire ranked list (or a portion thereof) may be presented to the other chat participant or to an agent serving as an intermediary between the automated chat system 106 and the other chat participant, for selection of a particular message that is most relevant or for other feedback information about the ranked list.

At block 212, the automated chat system 106 can conduct one or more automated chat sessions using the template pool 142 and template selection model 146. As used herein, the term "automated chat session" may in some embodiments refer to a chat session in which a message, or list of candidate messages, to be presented to a participant in the chat session is automatically chosen from a message template pool 142 using, e.g., a template selection model 146. The automatically-chosen message may be sent to the recipient without any human interaction, or the message (or list of candidate messages) may be provided to a human operator for selection, confirmation, revision, or override as needed. During the course of the automated chat sessions, the chat session feedback component 160 may record metrics and other feedback regarding the chat session for use in managing the template pool 142, template selection model 146, message clusters 124, or some combination thereof.

Figure 4A:
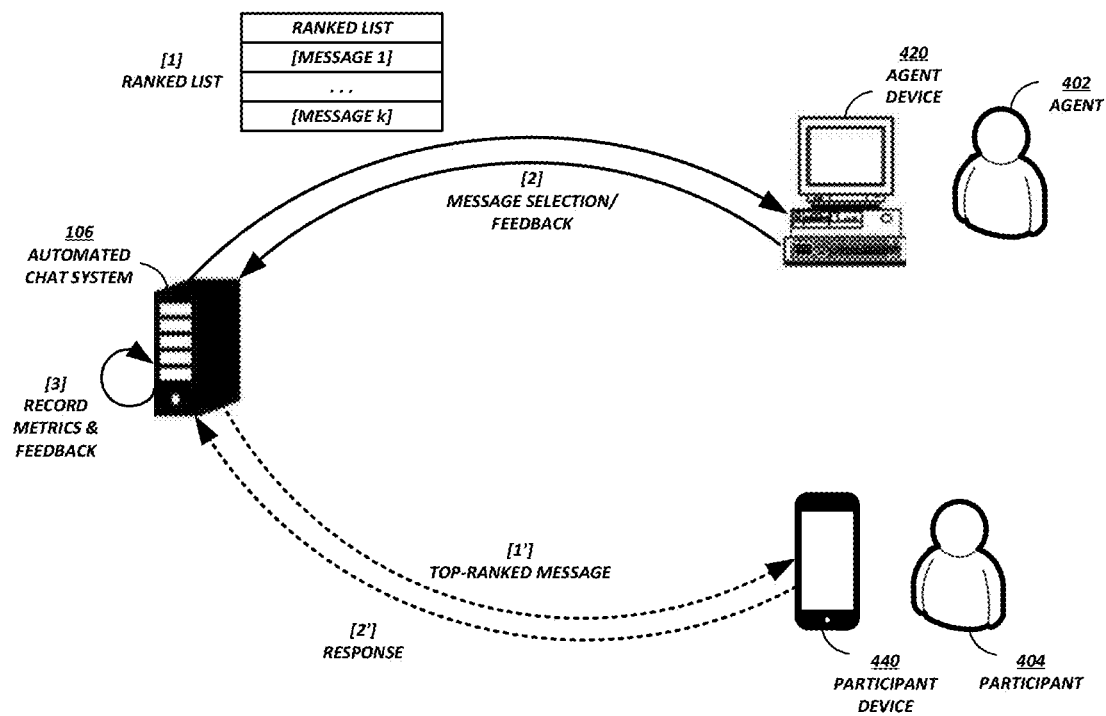
FIGS. 4A and 4B are diagrams of illustrative workflows for managing message templates based on data regarding message template selection and outcome events according to some embodiments.

FIG. 4A shows examples of interactions between the automated chat system 106 and one or more participants during an automated chat session. In some embodiments, as shown using solid lines, an agent 402 may serve as a participant in a chat session with the automated chat system 106. The agent's role may be to test the automated chat system 106 by using an agent device 420 to participate in a chat session and provide feedback regarding the chat session. The automated chat system 106 may conduct a chat session with the agent device 420 by receiving natural language input (e.g., textual messages) from the agent device 420, and selecting one or more templates from the template pool 142 using the template selection model 146 based on the received natural language input and/or other contextual information about the chat session. For example, the template selection component 162 may generate a ranked list of the top k message templates that would be selected based on the current context of the chat session. Because the participant is an agent 402, the automated chat system 106 may send the entire ranked list (or a subset thereof) to the agent device 420 at [1]. The agent 402 may then select the template from the ranked list that is the most relevant or otherwise most desired message for the current context of the chat session. The agent 402 may also or alternatively provide a response or subsequent dialog message to continue the chat session. The agent device 420 may then send data back to automatic chat system 106 at [2], indicating the selected message, other feedback information, and/or the agent's response. The selected message and/or other feedback may be recorded by the chat session feedback component 160 at [3], and the chat session may proceed.

In some embodiments, as shown in FIG. 4A using dotted lines, a chat session may occur directly between the automated chat system 106 and a participant 404, without an agent 402 serving as an intermediary, or with an agent serving as a third-party observer that does not affect the communication between the automatic chat system 106 and the participant 404. For example, the automatic chat system 106 may conduct a chat session with the participant device 440 by receiving natural language input (e.g., textual messages) from the participant device 440, and selecting one or more templates from the template pool 142 using the template selection model 146 based on the received natural language input and/or other contextual information about the chat session. If the template selection component 162 generates a ranked list of the top k message templates based on the current context of the chat session, the top-ranked message may be selected and sent to the participant device 440 at [1']. The participant 404 may provide a response or subsequent dialog message to continue the chat session at [2']. The selected message and/or other feedback may be recorded by the chat session feedback component 160, and the chat session may proceed. The agent device 420 may also receive the top-ranked message for feedback, or the entire ranked list for feedback, during or after the chat session between the automated chat system 106 and the participant 404. The agent device 420 may then send data back to automatic chat system 106 indicating the selected message, other feedback information, and/or the agent's response.

Figure 4B:
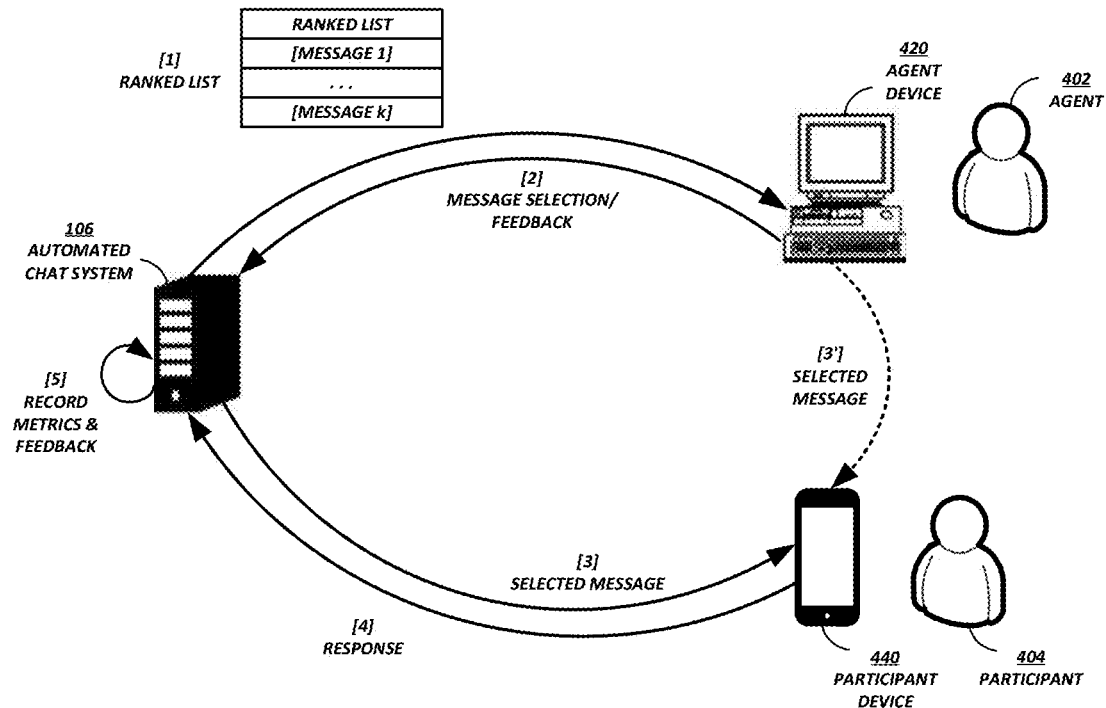

In some embodiments, as shown in FIG. 4B, the agent 402 may serve as a physical or logical intermediary between the automated chat system 106 and a chat participant 404 during a chat session. For example, the agent device 420 may provide to the automated chat system 106 a message selection, confirmation, revision, override, or other feedback regarding the automatically-selected message or ranked list of messages at [2]. The automated chat system 106 may then provide a selected message, optionally based on feedback from the agent device 420, to the participant device 440 at [3]. In some embodiments, rather than the agent device 420 only providing selection data or other feedback data to the automated chat system 106 at [2], the agent's selection of the most relevant or otherwise most desired may cause the selected message to be sent to the participant device 440 at [3']. The participant 404 may provide a response or subsequent dialog message to continue the chat session, and the participant device 440 may send response data back to the automatic chat system 106 at [4]. The response data and/or other feedback may be recorded by the chat session feedback component 160 at [5], and the chat session may proceed.

The chat session feedback component 160 may record or generate metrics regarding the chat session, to be used by the message management system 104 in modifying the template pool 142, template selection model 146, message clusters 124, or other data or components that affect the operation of the automated chat system 106. For example, the chat session feedback component 160 may monitor the turn acceptance rate for each message. The turn acceptance rate may represent the percentage of uses of a particular chat message that are accepted or indicated as relevant or desirable by an agent 402, or that elicit a desired response from a participant 404. As another example, the chat session feedback component 160 may monitor the average depth of rejection for each message. The average depth of rejection may represent the number of dialog message exchanges, or "turns," that have occurred during the chat session before the message is rejected. Rejection may be based on feedback from an agent 402, or based on an undesirable response from a participant 404 (e.g., a "restart" command, a request to connect to a human agent, etc.). A larger value for depth of rejection may indicate that the chat has gone on too long without finding a resolution, and messages at prior levels of the chat should be refined, new messages (or new clusters altogether) added, etc. As a further example, the chat session feedback component 160 may monitor the mean reciprocal rank of message templates accepted by the agent 402. The mean reciprocal rank may be determined based on agent selections of messages from a ranked list of the top-k messages for a given chat session context. If k=3, then the ranked list may include 3 messages. If the agent 402 selects the top-ranked message, then a value of 1 may be recorded. If the agent selects the second-ranked message, then a reciprocal of the placement may be recorded: a value of ½. If the agent selects the third-ranked message, a value of ⅓ may be recorded. The mean reciprocal rank may be computed for each message in the template pool or a subset thereof to indicate the relevance of the message for various chat session contexts. The mean reciprocal rank may be used to help identify messages other than the top-ranked message as being appropriate for a given context, while also factoring in the ranking of the message within those returned by the template selection model 146.

The chat session feedback component 160 may record or generate feedback information instead of, or in addition to, metrics regarding the chat session. For example, an agent 402 may provide a change to the wording of a message. As another example, an agent 402 may provide a completely new utterance for a message cluster to be included in the template pool. The example metrics and types of feedback described herein are illustrative only, and are not intended to be exhaustive, required, or limiting of the metrics and/or feedback that may be incorporated into the message management pipeline.

At decision block 214, the message management system 104 can determine whether to perform a message modification action based on feedback regarding the one or more chat sessions conducted using the template pool 142. In some embodiments, the determination may be made on a periodic basis, such as after a period of time, after a quantity of chat sessions, or after a quantity of message selection operations. In some embodiments, the determination may be based on the metrics or other feedback obtained during chat sessions. For example, after a threshold number of messages are rejected, or in response to satisfaction of some other criterion as described in greater detail below with respect to the individual message modification actions. If a message modification action is to be performed, the process 200 may proceed to block 216. Otherwise, the process 200 may return to block 212 to conduct additional automated chat sessions.

At block 216, the message management system 104 can perform a message modification action based on feedback received from the automated chat system 106.

In some embodiments, the message modification action may include removing a cluster from consideration such that there is no representative message for the cluster included in the template pool. This message modification action may be triggered when multiple messages associated with the same message cluster consistently perform poorly as indicated by rejections from agents or participants. As another example, this message modification action may be triggered after a threshold quantity or percentage of selections by agents of other more-relevant messages associated with other message clusters. When this message modification action is triggered, the representative message selection component 140 may remove all messages associated with particular cluster from the template pool 142.

In some embodiments, the message modification action may include adding a message cluster to consideration such that messages from the message cluster are included in the template pool. This message modification action may be triggered when there is a spike in the average depth of rejection in terms of turn count, indicating that there may be a missing message type in the template pool. To implement this message modification action, the representative message selection component 140 may select a representative message from a message cluster that was not previously represented in the template pool 142. In addition, or alternatively, the clustering process may be performed again with an increased target quantity of clusters such that a new cluster or clusters will be generated and a representative message from the new cluster(s) may be added to the template pool 142.

In some embodiments, the message modification action may include swapping one representative message from a message cluster for a new representative message from that same message cluster. This message modification action may be triggered when a message consistently performs poorly as indicated by rejections from agents or participants. As another example, this message modification action may be triggered after a threshold quantity or percentage of selections by agents of other more-relevant messages. As a further example, this message modification action may be triggered periodically to allow other messages of the message cluster to be explored as representative messages. To implement this message modification action, the representative message selection component 140 may select a different representative message from the message cluster based on a value, such as a selection probability (e.g., generated above at block 208). For example, the message associated with the best performance (e.g., most acceptances) may be the representative message for the cluster, while other messages of the cluster may have selection probabilities based their own performance. The other messages may be selected for use on a random or periodic basis (e.g., using their selection probabilities) to explore their performance. The overall tracking of performance, setting of selection probabilities, and modification of selection probabilities and/or the representative message may be performed using a variety of different reinforcement learning algorithms, such as those associated with the "multi-armed bandit problem" as described in "Multi-Armed Bandit Algorithms and Empirical Evaluation," by Vermorel, J., & Mohri, M., published in "In European Conference on Machine Learning (pp. 437-448), the contents of which are incorporated by reference herein and made part of this specification. For example, the message management system 106 may use c greedy, softmax, interval estimation, Thompson sampling, or the like.

In some embodiments, the message modification action may include modifying the wording of a representative message. This message modification may be triggered in response to an agent submitting such a change.

In some embodiments, the message modification action may include adding a new representative message to the template pool for a particular message cluster. This message modification may be triggered in response to an agent summitting such a new message.

The example message modification actions described herein are illustrative only, and are not intended to be limiting, required, or exhaustive of all message modification actions that may be implemented.

Example Message Clustering Process

FIG. 5 shows an illustrative workflow for generating message clusters from a corpus of chat messages. The encoding and clustering component 122 may obtain, from the messages data store 120, the corpus of chat messages or some subset thereof, such as chat messages associated with a particular entity or data domain. The encoding and clustering component 122 may include an encoding module 502 to encode the messages into a form that may be more efficiently analyzed than text strings. In some embodiments, the encoding module 502 may be or include an autoencoder that generates the encoded representations and tests whether they include enough information to reconstruct the original textual messages (or something close to the original textual messages). The encoding and clustering component 122 may include a clustering module 504 to analyze the encoded representations of the messages and determine clusters of semantically-related messages. As described in greater detail below, the operations of the encoding module 502 and clustering module 504 may be performed separately and sequentially (e.g., the encoded representations are generated, tested, and optimized first prior to clustering), or they may be performed iteratively and jointly (e.g., the testing and optimization of the encoded representations and clusters may be performing using a joint training process, such as using a composite objective function).

The encoding module may generate the encoded representations of the messages as sentence embeddings 524. Generally described, sentence embeddings 524 may be fixed-length encoded representations of sentences or of other variable-length sets of words. The sentence embeddings 524 may take the form of multi-element vectors, where the quantity of elements is the same for each sentence embedding 524 regardless of the length of the messages that they represent. The sentence embeddings 524 may be generated such that they represent the salient semantic information needed to reconstruct the chat messages in a form that is close textually and/or semantically to their original textual form.

To generate a sentence embedding 524 for a particular message, the encoding module 502 may in some embodiments first generate a word embedding 522 for each word of a message 500. The message 500 may be parsed into a set of tokens 520, where each token corresponds to a word of the message. A separate word embedding 522 may be generated or otherwise obtained for each token. Similar to a sentence embedding 524, a word embedding 522 may be a fixed-length encoded representation of otherwise variable-length words, and may take the form of multi-element vectors that have the same quantity of real-valued elements regardless of the length of the words that they represent. For example, the word embeddings may be 300-length vectors. The word embeddings 522 may be obtained using a lookup of pre-generated word embeddings, or may be generated using any of a variety of algorithms, such as those that utilize a neural network to generate the vectors. For example, word embeddings may be obtained using Word2vec models, fastText models, GloVe models, or the like.

To generate a sentence embedding 524 from a set of word embeddings 522, the encoding module 502 may implement any of a variety of techniques. In some embodiments, the word embeddings 522 may be combined element-by-element to generate a sentence embedding 524 vector that is the same length as the word embedding 522 vectors. For example, given n-dimension word embeddings 522 (where n is a positive integer such as 300), for each element 0 to n−1, the values of that individual element of each word embedding 522 vector may be averaged or summed, or the maximum or median value may be determined, and the resulting value may be used as the value of the corresponding element of the sentence embedding 524. In some embodiments, additional or alternative operations may be performed on the word embeddings 522 to generate sentence a sentence embedding 524. For example, the word embeddings 522 may be passed through a neural network or layer thereof, such as a bi-directional long short-term memory ("Bi-LSTM") network or layer to generate the sentence embeddings 524.

To test the sentence embeddings 524, the encoding module 502 may in some embodiments attempt to reconstruct the original messages 500, from which the sentence embeddings 524 were generated, into reconstructed messages 550. For example, the encoding module 502 may be implemented as an autoencoder, with the sentence embeddings 524 generated using the encoder portion of the autoencoder, and the message reconstruction performed using the decoder portion of the autoencoder to generate the reconstructed messages 550. The autoencoder may be trained to minimize reconstruction errors (such as squared errors), often referred to as the "loss," by optimizing for a loss function through back-propagation. A loss function (also referred to as an "objective function") is used to determine a degree to which output for a given input differs from the expected or desired output for the given input. A gradient of the loss function with respect to the parameters of the autoencoder is computed, and the parameters are then modified to minimize the loss function and, therefore, minimize the degree to which output differs from expected or desired output. Once a sufficient degree of loss is achieved, the process may be stopped and the sentence embeddings 524 generated using the encoder portion with its updated parameters may be provided to the clustering module 504.

The clustering module 504 may generate message clusters by analyzing the sentence embeddings 524 and detecting similarities and differences between the sentence embeddings. Based on the detected similarities and differences, the clustering module 504 may separate the sentence embeddings into clusters of similar sentence embeddings. The number of clusters to be obtained may be predetermined or dynamically determined, such as by using a tunable hyperparameter indicating the number of clusters. Results generated using different values for the hyperparameter may be compared to select a particular set of clusters. The clusters may be obtained using any of a variety of algorithms, such as k-means clustering means-shift clustering, DBSCAN, agglomerative clustering, etc. Depending upon the particular clustering method used, the clustering module 504 may be trained to minimize intra-cluster distances (such as squared Euclidian distances) by optimizing for a loss function. Once a sufficient degree of loss is achieved, the process may be stopped and the message clusters 124 may be provided to the message management system 104.

In some embodiments, the optimization of sentence embeddings 524 and message clusters 124 may be performed jointly, rather than sequentially, in a multi-task training or optimization process. For example, sets message clusters may be iteratively generated for several iterations, and each iteration may include: (1) generating a set of sentence embeddings using the most-recently-updated parameters of encoding module 502 for doing so; (2) generating a set of message clusters using the most-recently-updated parameters of the clustering module 504 for doing so; and (3) jointly updating the parameters of both the encoding module 502 and the clustering module 504 by using a composite loss function that includes the loss function of the encoding module 502 as a first component and the loss function of the clustering module 504 as a second component.

The different components of the composite loss function may be weighted such that the optimization favors one component (and therefore one task of the multi-task process) over the other component. For example, the weighted composite of the loss functions may have the form of a weighted sum, as shown in equation [1]:

$$C = w_1 C_1 + w_2 C_2 \qquad [1]$$

where $w_1$ and $C_1$ are the weight and loss function, respectively, for the autoencoder task, and $w_2$ and $C_2$ are the weight and loss function, respectively, for the clustering task. In some embodiments, the weights may be tunable hyperparameters. The encoding and clustering component 122 can compute the gradient of the composite loss function with respect to the individual parameters of the encoding module 502 and the clustering module 524. The gradient can be computed as the derivative ∂C/∂p of the loss function C with respect to any parameter p of the encoding module 502 and decoding module 504. This gradient may be used to modify the parameters of the encoding module 502 and decoding module 504 to reduce a difference metric such as the "error" of the tasks (e.g., the reconstruction error of the autoencoder, and the clustering error of the clustering module), as determined using the composite loss function.

The example encoding methods, clustering methods, loss functions, sequential processes, and joint multi-task processes described herein are illustrative only, and are not intended to be limiting, required, or exhaustive. In some embodiments, additional and/or alternative encoding methods, clustering methods, loss functions, sequential processes, and/or joint multi-task processes may be used. In addition, any aspect of any embodiment described herein may be used with any aspect of any other embodiment.

Execution Environment

Figure 6:
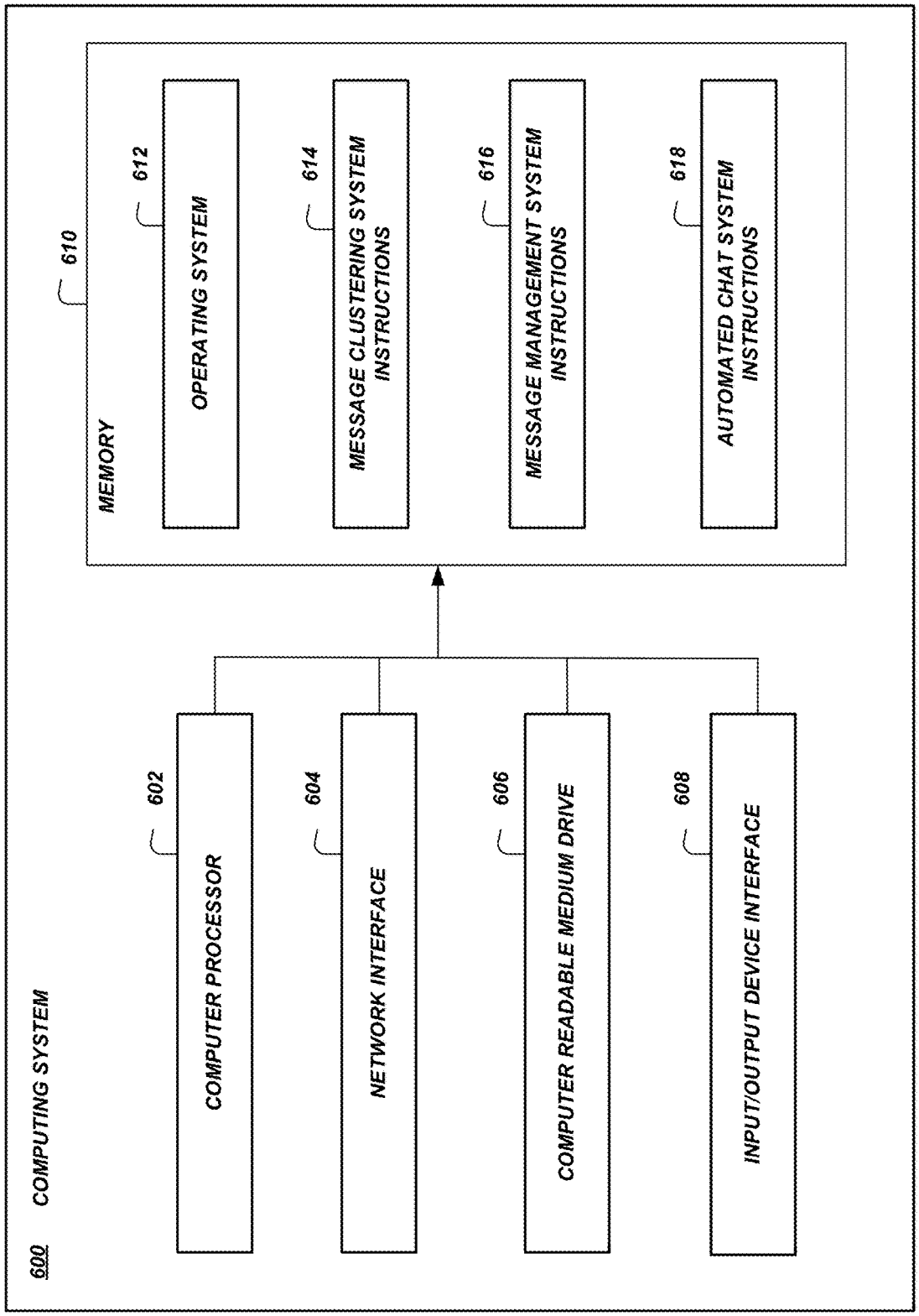
FIG. 6 is a block diagram of an illustrative computing system configured to implement aspects of the message clustering system, message template management system, and/or conversation management system according to some embodiments.

FIG. 6 illustrates an example computing system 600 configured to execute the processes and implement the features described above. In some embodiments, the computing system 600 may include: one or more computer processors 602, such as physical central processing units ("CPUs"); one or more network interfaces 604, such as a network interface cards ("NICs"); one or more computer readable medium drives 606, such as a high density disk ("HDDs"), solid state drives ("SDDs"), flash drives, and/or other persistent non-transitory computer-readable media; an input/output device interface 608, such as an IO interface in communication with one or more microphones; and one or more computer readable memories 610, such as random access memory ("RAM") and/or other volatile non-transitory computer-readable media.

The computer readable memory 610 may include computer program instructions that the computer processor 602 executes in order to implement one or more embodiments. For example, the computer readable memory 610 can store an operating system 612 that provides computer program instructions for use by the computer processor 602 in the general administration and operation of the computing system 600. The computer readable memory 610 may also include message clustering instructions 614 for implementing features of the message clustering system 102. The computer readable memory 610 may also include message management instructions 616 for implementing features of the message management system 104. The computer readable memory 610 may also include automated chat system instructions 618 for implementing features of the automated chat system 106.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a computer processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A computer processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a data store storing a set of customer service messages; and
   one or more computer processors in communication with the data store and programmed by executable instructions to at least:
   generate a plurality of message clusters using the set of customer service messages and a multi-task clustering process,
   wherein the multi-task clustering process comprises a first task to minimize a first difference metric associated with reconstructing textual customer service messages of the set of customer service messages based on embedding representations of the textual customer service messages, and
   wherein the multi-task clustering process comprises a second task to minimize a second difference metric associated with assigning individual customer service messages of the set of customer service messages to individual message clusters of the plurality of message clusters;
   generate a set of message templates comprising a representative customer service message from each message cluster of the plurality of message clusters, wherein a representative customer service message from a given message cluster is included as a message template in the set of message templates based on a confidence metric;
   train a message selection model to select message templates of the set of message templates based on a context of a customer service chat session;
   receive, from a computing device, a first input customer service message associated with a first customer service chat session;
   determine, based on the message selection model, a first message template of the set of message templates to be presented in response to the first input customer service message;
   receive, from the computing device, a second input customer service message in response to presentation of the first message template; and
   perform a modification action based on the second input customer service message, wherein the modification action modifies the set of message templates.

2. The system of claim 1, wherein to perform the modification action, the one or more computer processors are programed by the executable instructions to replace the first message template with a second message template, wherein the first message template and the second message template are both assigned to a same message cluster of the plurality of message clusters.

3. The system of claim 1, where the context of the customer service chat session represents at least one of: one or more input customer service messages received during the customer service chat session, one or more message templates presented during the customer service chat session, or profile information regarding a participant of the customer service chat session.

4. The system of claim 1, wherein the multi-task clustering process comprises evaluating a composite objective function comprising the first difference metric and the second difference metric.

5. A computer-implemented method comprising:
   as performed by one or more computing devices configured with specific computer-executable instructions,
   selecting, for a message template pool, a representative message from each message cluster of a plurality of message clusters, wherein each message cluster of the plurality of message clusters comprises a different subset of a set of messages;
   selecting a first message template of the message template pool for presentation to a participant of an automated chat session based at least partly on a template selection model and a context of the automated chat session;
   generating feedback data representing a response to presentation of the first message template;
   determining, based on the feedback data, that a modification criterion associated with the first message template is satisfied; and executing a modification action on the message template pool based on the feedback data satisfying the modification criterion.

6. The computer-implemented method of claim 5, wherein determining, based on the feedback data, that the modification criterion associated with the first message template is satisfied comprises determining that a rejection rate associated with the first message template satisfies a threshold.

7. The computer-implemented method of claim 5, wherein determining, based on the feedback data, that the modification criterion associated with the first message template is satisfied comprises determining that a depth of rejection metric, representing a number of messages exchanged prior to rejection of the first message template, satisfies a threshold.

8. The computer-implemented method of claim 5, wherein executing the modification action on the message template pool comprises replacing the first message template in the message template pool with a second message template, wherein the second message template is assigned to a same message cluster to which the first message template is assigned.

9. The computer-implemented method of claim 5, wherein executing the modification action on the message template pool comprises removing the first message template from the message template pool without adding any replacement message template to the message template pool as a representative message for a message cluster to which the first message template is assigned.

10. The computer-implemented method of claim 5, further comprising adding a new message cluster to the plurality of message clusters, wherein executing the modification action on the message template pool comprises adding to the message template pool a new message template, wherein the new message template comprises a representative message for the new message cluster.

11. The computer-implemented method of claim 5, wherein executing the modification action on the message template pool comprises modifying the first message template based on message data in the response to presentation of the first message template.

12. The computer-implemented method of claim 5, further comprising adding a new message template to the message template pool, the new message template comprising message data in the response to presentation of the first message template.

13. The computer-implemented method of claim 5, wherein selecting a representative message from each message cluster of the plurality of message clusters comprises selecting a first message from a first message cluster of the plurality of message clusters based at least partly on a confidence metric associated with the first message.

14. The computer-implemented method of claim 13, further comprising generating the confidence metric, wherein the confidence metric represents a difference between a first data vector comprising an encoded representation of the first message and a second data vector comprising a mean of encoded representations of messages of the plurality of message clusters.

15. The computer-implemented method of claim 5, further comprising:
generating a plurality of sentence embeddings, wherein a first sentence embedding of the plurality of sentence embeddings comprises a vector representation of a first message of the set of messages observed during one or more chat sessions; and
generating the plurality of message clusters based at least partly on differences between individual sentence embeddings of the plurality of sentence embeddings.

16. The computer-implemented method of claim 15, further comprising executing a multi-task clustering process, wherein a first task of the multi-task clustering process comprises generating the plurality of sentence embeddings based at least partly on a first loss function, wherein a second task of the multi-task clustering process comprises generating the plurality of message clusters based at least partly on a second loss function, and wherein multi-task clustering process comprises evaluating a composite loss function comprising the first loss function and the second loss function.

17. A system comprising:
computer-readable memory storing executable instructions; and
one or more processors in communication with the computer-readable memory and programmed by the executable instructions to:
select, for a message template pool, a representative message from each message cluster of a plurality of message clusters, wherein each message cluster of the plurality of message clusters comprises a different subset of a set of messages;
select a first message template of the message template pool for presentation to a participant of an automated chat session based at least partly on a template selection model and a context of the automated chat session;
generate feedback data representing a response to presentation of the first message template;
determine, based on the feedback data, that a modification criterion associated with the first message template is satisfied; and
execute a modification action on the message template pool based on the feedback data satisfying the modification criterion.

18. The system of claim 17, wherein to determine, based on the feedback data, that the modification criterion associated with the first message template is satisfied, the one or more processors are configured to determine that a rejection rate associated with the first message template satisfies a threshold.

19. The system of claim 17, wherein to execute the modification action on the message template pool, the one or more processors are configured to replace the first message template in the message template pool with a second message template, wherein the second message template is assigned to a same message cluster to which the first message template is assigned.

20. The system of claim 17, wherein the one or more processors are further configured to:
generate a plurality of sentence embeddings, wherein a first sentence embedding of the plurality of sentence embeddings comprises a vector representation of a first message of the set of messages observed during one or more chat sessions;
generate the plurality of message clusters based at least partly on differences between individual sentence embeddings of the plurality of sentence embeddings; and
evaluate a composite loss function comprising a first component loss function associated with generating the plurality of sentence embeddings and a second component loss function associated with generating the plurality of message clusters.

* * * * *